(12) United States Patent
Witchey

(10) Patent No.: US 6,519,983 B2
(45) Date of Patent: Feb. 18, 2003

(54) BACKHOE LOCK

(76) Inventor: Bryan Witchey, 209 Fairway Cir., Cross Junction, VA (US) 22625

(*) Notice: Subject to any disclaimer, the term of this patent is extended or adjusted under 35 U.S.C. 154(b) by 0 days.

(21) Appl. No.: 10/062,402

(22) Filed: Feb. 5, 2002

(65) Prior Publication Data

US 2002/0104336 A1 Aug. 8, 2002

Related U.S. Application Data

(60) Provisional application No. 60/266,632, filed on Feb. 5, 2001.

(51) Int. Cl.⁷ .............................................. B60R 25/02
(52) U.S. Cl. ................................ 70/209; 70/14; 70/58; 70/238
(58) Field of Search .............................. 70/14, 18, 19, 70/57, 58, 198–200, 201–203, 209, 247, 238, 258

(56) References Cited

U.S. PATENT DOCUMENTS

| | | | | |
|---|---|---|---|---|
| 1,089,319 A | * | 3/1914 | Campbell | 70/200 X |
| 1,291,617 A | * | 1/1919 | O'Leary et al. | 70/202 X |
| 1,384,590 A | | 7/1921 | Bottone | 70/18 |
| 1,465,926 A | * | 8/1923 | Weitzman | 70/201 X |
| 2,931,207 A | * | 4/1960 | Fisher | 70/181 |
| 3,392,471 A | * | 7/1968 | Foote | 70/202 X |
| 4,008,590 A | | 2/1977 | Berkowitz et al. | 70/424 |
| 4,076,095 A | * | 2/1978 | Adamski | 70/14 X |
| 4,297,914 A | * | 11/1981 | Klem et al. | 70/201 X |
| 4,360,074 A | | 11/1982 | Parquet | 180/287 |
| 4,373,851 A | | 2/1983 | Confoey | 414/722 |
| 4,417,644 A | | 11/1983 | Brogard | 180/287 |
| 4,825,670 A | * | 5/1989 | Snow | 70/238 |
| 5,007,259 A | * | 4/1991 | Mellard | 70/209 |
| 5,195,340 A | | 3/1993 | Huang | 70/384 |
| 5,275,030 A | * | 1/1994 | Cole | 70/209 |
| 5,331,307 A | | 7/1994 | Eizen | 340/426 |
| 5,511,399 A | * | 4/1996 | Lynn | 70/19 |
| 5,570,600 A | | 11/1996 | Hua | 70/247 |
| 5,572,889 A | | 11/1996 | Ping-Hua | 70/247 |
| 5,579,923 A | * | 12/1996 | Hemmerlein | 211/4 |
| 5,887,464 A | * | 3/1999 | Perez | 70/209 |
| 5,920,254 A | | 7/1999 | Hsieh | 70/209 X |
| 5,979,197 A | * | 11/1999 | Mellini et al. | 70/199 |
| 6,000,256 A | * | 12/1999 | Pornaghdi | 70/247 |
| 6,142,313 A | * | 11/2000 | Young | 70/58 X |
| 6,173,590 B1 | | 1/2001 | Witchey | 70/14 |
| 6,330,815 B1 | * | 12/2001 | Duncan | 70/58 |
| 6,367,293 B1 | * | 4/2002 | Elliott | 70/57 |
| 6,382,000 B1 | * | 5/2002 | Horton | 70/202 X |

* cited by examiner

*Primary Examiner*—Suzanne Dino Barrett
(74) *Attorney, Agent, or Firm*—Richard C. Litman

(57) ABSTRACT

The backhoe lock is a device for locking the forward-reverse lever of a backhoe to the steering wheel. The backhoe lock has a base plate having two parallel rows of posts extending from its top surface, including a group of four posts arranged substantially in a square configuration, and another spaced apart pair of posts aligned linearly with opposing sides of the square. The middle pair of posts are notched. A lock plate has a plurality of holes defined therein in the same configuration as the posts so that the lock plate may slide over the posts. A lock mechanism is installed in the lock plate and controls a catch which engages the notches in the middle pair of posts so that the lock plate cannot be removed from the posts without inserting a key in the lock and rotating the cylinder.

17 Claims, 6 Drawing Sheets

BACKHOE LOCK

CROSS-REFERENCE TO RELATED APPLICATION

This application claims the benefit of U.S. Provisional Patent Application Serial No. 60/266,632, filed Feb. 5, 2001.

BACKGROUND OF THE INVENTION

1. Field of the Invention

The present invention relates to a backhoe lock, and particularly to a lock which secures the forward/reverse lever of a backhoe or throttle control lever of an agricultural machine to the steering wheel to deter theft and vandalism.

2. Description of the Related Art

Earth moving construction equipment, such as backhoes, is commonly transported to a job site by flatbed truck and remains at the job site until the project is completed or until the machines are no longer needed. The equipment is usually left unattended at the job site at the end of the work day, and becomes a target for thieves and vandals. While the risk of theft and vandalism may be reduced by fencing in the job site and/or by providing a night watchman, such measures are expensive and not entirely effective. A convenient, economical, and easy to use locking mechanism which renders the machine inoperative for practical purposes, and that can be put in place at the end of the work day and removed at the beginning of the next day without the expenditure of significant time and effort is therefore desirable.

Lock devices specifically designed for backhoes and similar earth moving equipment have usually involved devices for keeping the stabilizer arm extended, such as a hinged cylindrical sleeve, or a semicylindrical sleeve, which can be locked around the piston of a stabilizer arm with the arm extended. Such devices are described in U.S. Pat. No. 4,373,851, issued Feb. 15, 1983 to R. J. Confoey, and U.S. Pat. No. 4,417,644, issued Nov. 29, 1983 to P. D. Brogard. U.S. Pat. No. 4,360,074, issued Nov. 23, 1982 to D. J. Parquet shows a hydraulic locking device for a backhoe having a plurality of hydraulically controlled rotary valves which keep the stabilizer arm extended to the ground.

Several devices are known for locking an automobile steering wheel or ignition lock. U.S. Pat. No. 4,008,590, issued Feb. 22, 1977 to Berkowitz et al., discloses a locking case which conforms to a steering column and covers the vehicle ignition. U.S. Pat. No. 5,920,254, issued Jul. 6, 1999 to C. Hsieh, describes a steering wheel lock with an alarm and a radio transmitter. A locking bar for a skid steer loader is described in my prior patent, U.S. Pat. No. 6,173,590, issued Jan. 16, 2001.

Still other lock devices are known for locking a floor shift gear lever, including U.S. Pat. No. 5,331,307, issued Jul. 19, 1994 to N. Eizen (mounting bracket bolted to floor near gear lever and a yoke received by holes in the bracket); U.S. Pat. No. 5,570,600, issued Nov. 5, 1996 to W. P. Hua (similar to the Eizen device, but with a U-shaped sleeve having lugs receiving the yoke or U-shaped bar); and U.S. Pat. No. 5,572,889, issued Nov. 12, 1996 to W. Ping-Hua (similar to the '600 device, but with a cylindrical sleeve inserted over the gear shift lever).

U.S. Pat. No. 1,384,590, issued Jul. 12, 1921 to V. R. Buttone, describes a lock for locking the control levers of an automobile having a U-bar with aligned recesses, a crossbar having lugs which receive the parallel legs of the U-bar, and a locking rod disposed in the crossbar which engages recesses in the U-shaped bar and in the crossbar. U.S. Pat. No. 5,195,340, issued Mar. 23, 1993 to T. Huang, shows a lock with a U-shaped bar having legs that extend transversely through a hollow rod having a key plug assembly and a locking plate assembly disposed in the hollow rod.

None of the foregoing patents show a device for locking a steering wheel to a forward-reverse lever or throttle control lever. None of the above inventions and patents, taken either singly or in combination, is seen to describe the instant invention as claimed. Thus a backhoe lock solving the aforementioned problems is desired.

SUMMARY OF THE INVENTION

The backhoe lock is a device for locking the forward-reverse lever of a backhoe to the steering wheel. The backhoe lock has a base plate having two parallel rows of posts extending from its top surface, including a group of four posts arranged substantially in a square configuration, and another pair of posts aligned linearly with opposing sides of the square but spaced apart by a distance greater than the length of a side of the square. The middle pair, of posts are notched. A lock plate has a plurality of holes defined therein in the same configuration as the posts so that the lock plate may slide over the posts. A lock mechanism is installed in the lock plate and controls a catch which engages the notches in the middle pair of posts so that the lock plate cannot be removed from the posts without inserting a key in the lock and rotating the cylinder.

Preferably the lock mechanism is spring biased and the notches in the middle pair of posts are configured so that when the key is moved into the locked position, the lock plate will slide down the posts, but is prevented from rising up the posts, after the fashion of a ratchet. In use, the backhoe lock is used to clamp and lock the forward-reverse lever and a spoke of the steering wheel in parallel relation so that movement of the steering wheel and forward-reverse lever are restricted in order to render the backhoe inoperable for practical purposes.

Although principally designed for use with a backhoe, the device is versatile enough to be used with a shooting boom forklift, articulating loaders and dump trucks, rollers, graders, mini-backhoes and excavators, agricultural equipment, and boats.

Accordingly, it is a principal object of the invention to provide a backhoe lock having a base plate and a lock plate which cooperate to lock a control lever to a steering wheel in order to deter theft and vandalism of backhoes, and other mobile equipment and machinery.

It is another object of the invention to provide a backhoe lock having a base plate with a unique configuration of posts extending from its top surface designed to accommodate both a forward-reverse control lever and a portion of a steering wheel therebetween.

It is a further object of the invention to provide a backhoe lock having a lock plate which ratchets down the guide posts of a base plate and is retained thereon until a lock mechanism is released.

Still another object of the invention is to provide a backhoe lock which is convenient, economical, and easy to use for preventing the theft or vandalism of construction machinery left unattended at a job site.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
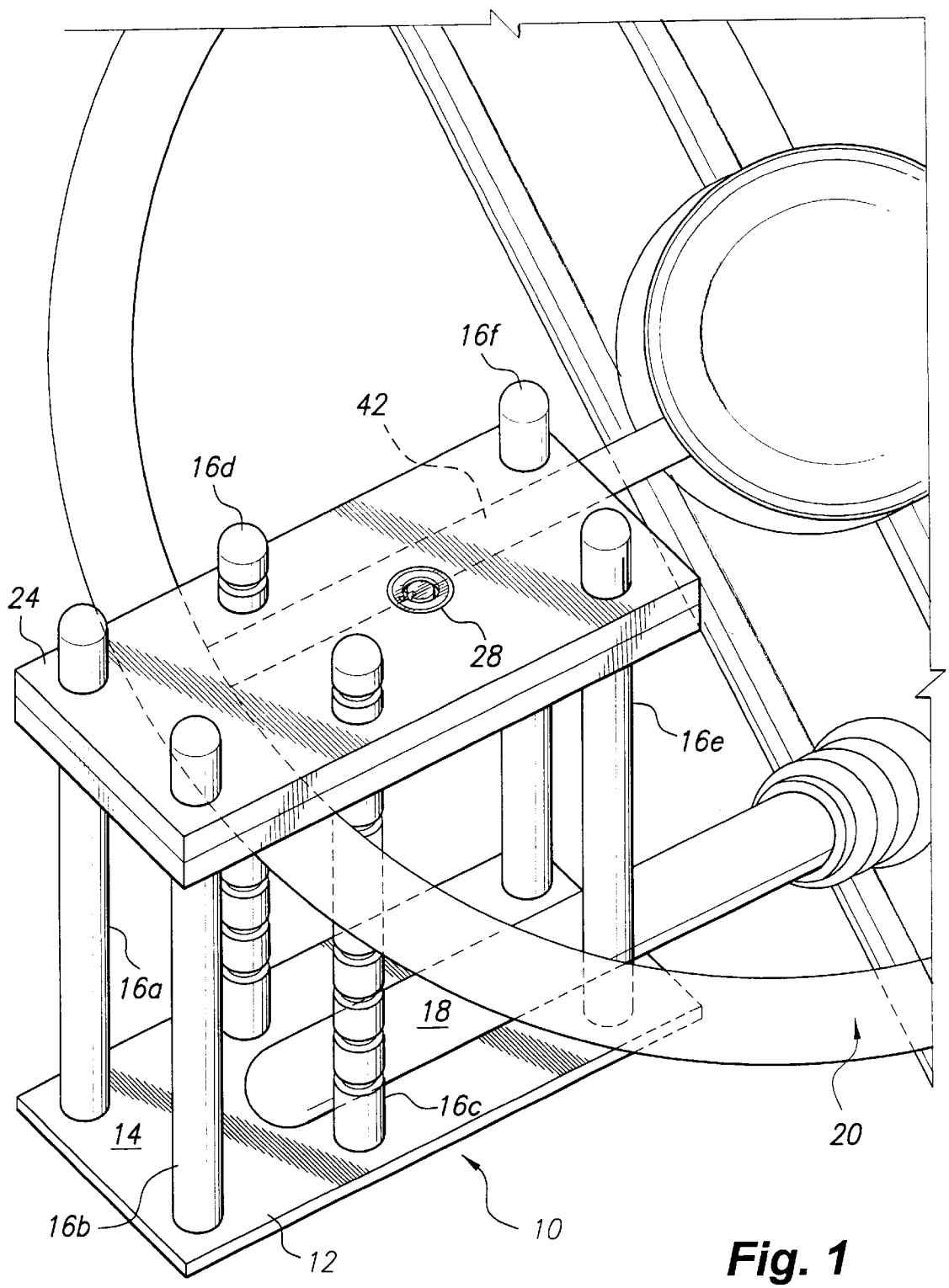
FIG. 1 is an environmental, perspective view of a backhoe lock according to the present invention securing a forward-reverse lever to a steering wheel.
Figure 2:
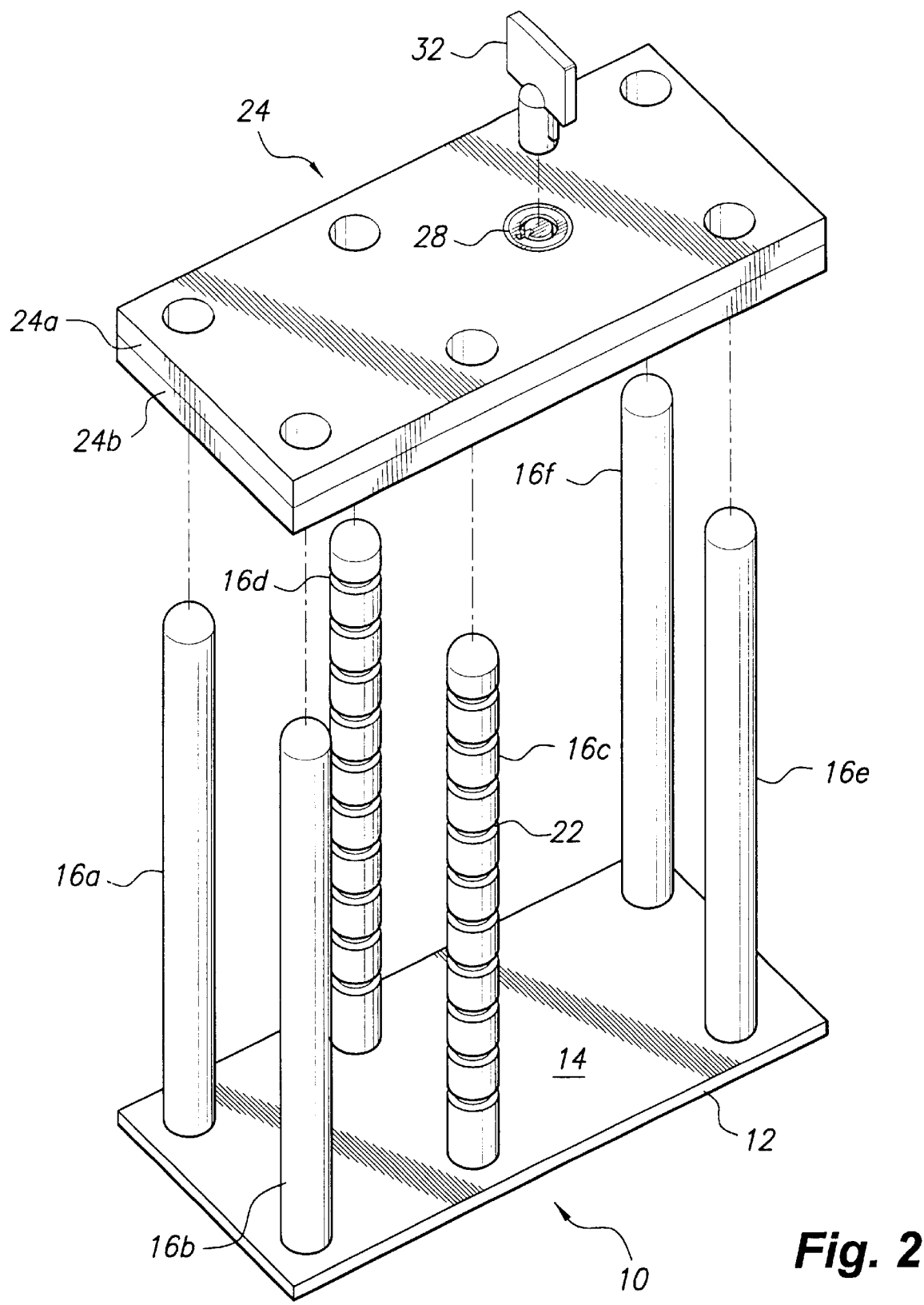
FIG. 2 is an exploded, perspective view of a backhoe lock according to the present invention.

The present invention is a backhoe lock, designated generally as 10 in the drawings, for disabling the controls of a backhoe to deter theft and vandalism. Although principally designed for use with a backhoe, the device is versatile enough to be used with a shooting boom forklift, articulating loaders and dump trucks rollers, graders, mini-backhoes and excavators, agricultural equipment, and boats As shown in FIGS. 1 and 2, the backhoe lock 10 includes a flat, rectangular base plate 12 having a top surface 14 on which a plurality of posts 16 are mounted normal to the base plate. The posts 16 are arranged in a particular configuration designed fog alignment with the forward-reverse lever 18 and steering wheel 20 of a backhoe. Preferably the posts 16 include four posts 16a, 16b, 16c, and 16d arranged in a substantially square configuration. The two end posts 16a and 16b have a substantially smooth outer surface about their circumference, while the middle posts 16c and 16d have a plurality of notches 22 defined in their outer surface which are spaced apart throughout the length of the posts 16c and 16d. End posts 16e and 16f are mounted on the base plate 12 so that post 16e is linearly aligned with the side of the square defined by posts 16b and 16c, while post 16f is linearly aligned with the side of the square defined by posts 16a and 16d. End posts 16e and 16f are spaced apart from middle posts 16c and 16d, respectively, by a distance greater than the spacing between posts 16b–16c and 16a–16d, respectively. The outer surface of end posts 16e and 16f is substantially smooth about the circumference of the posts 16e and 16f.

Representative dimensions for the base plate 12 may be about 6 ⅜"×3" by ¼". The posts 16 may be about ½" in diameter, and about eight inches in length. Posts 16a, 16b, 16c, and 16d may be arranged in a square which measures about 2"×2", measured center to center. Posts 16e and 16f may be spaced apart from posts 16c and 16d by at least three inches. It will be understood that the recitation of dimensions in the present application is exemplary and for purposes of enablement only, and not by way of limitation. Actual dimensions may vary, and the number and configuration of the posts 16 on the base plate 12 may be varied, depending upon the configuration of the steering wheel and control lever of the machine or equipment the lock 10 is applied to.

Figure 4:
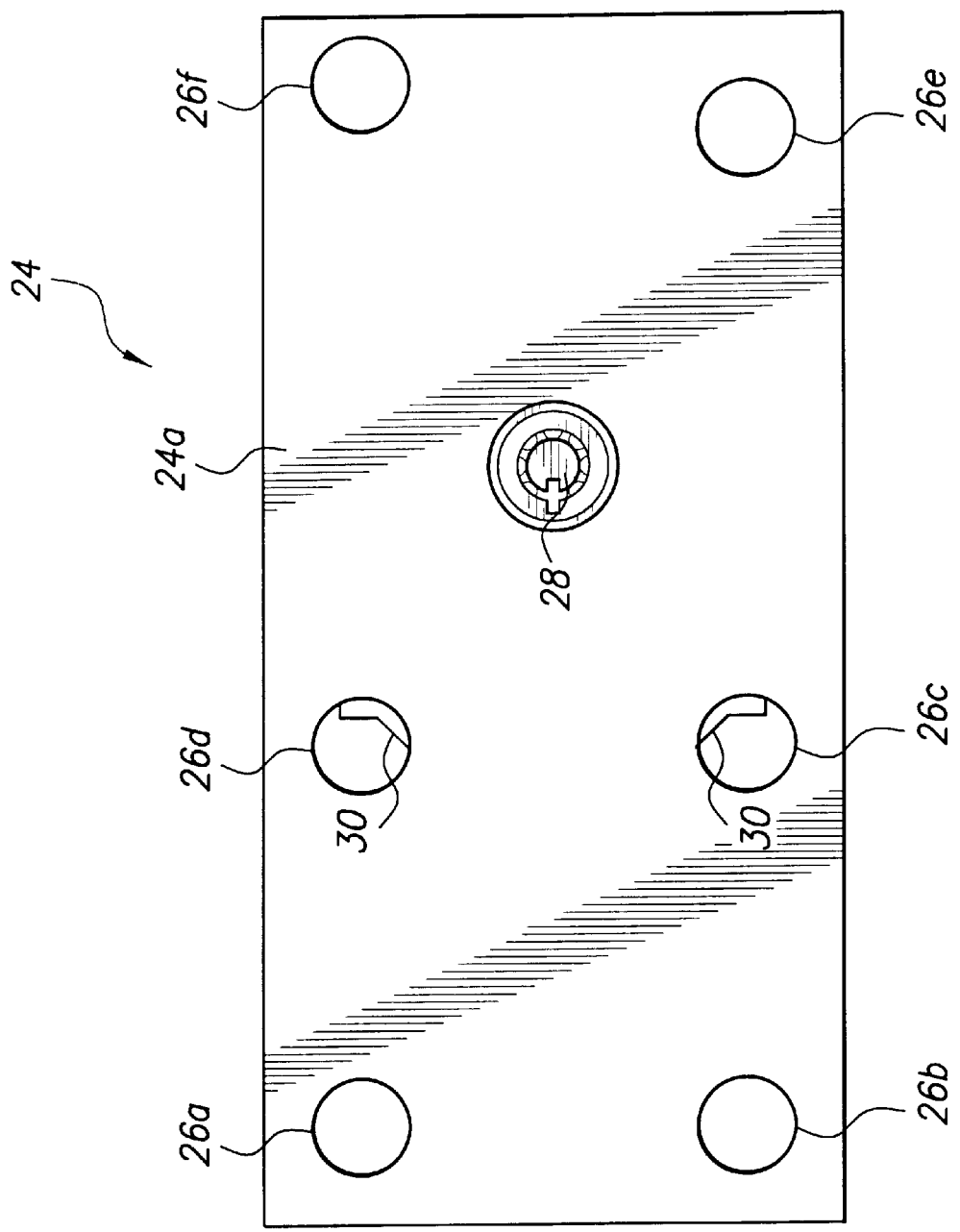
FIG. 4 is a top view of a lock plate according to the present invention in the locked position.
Figure 5:
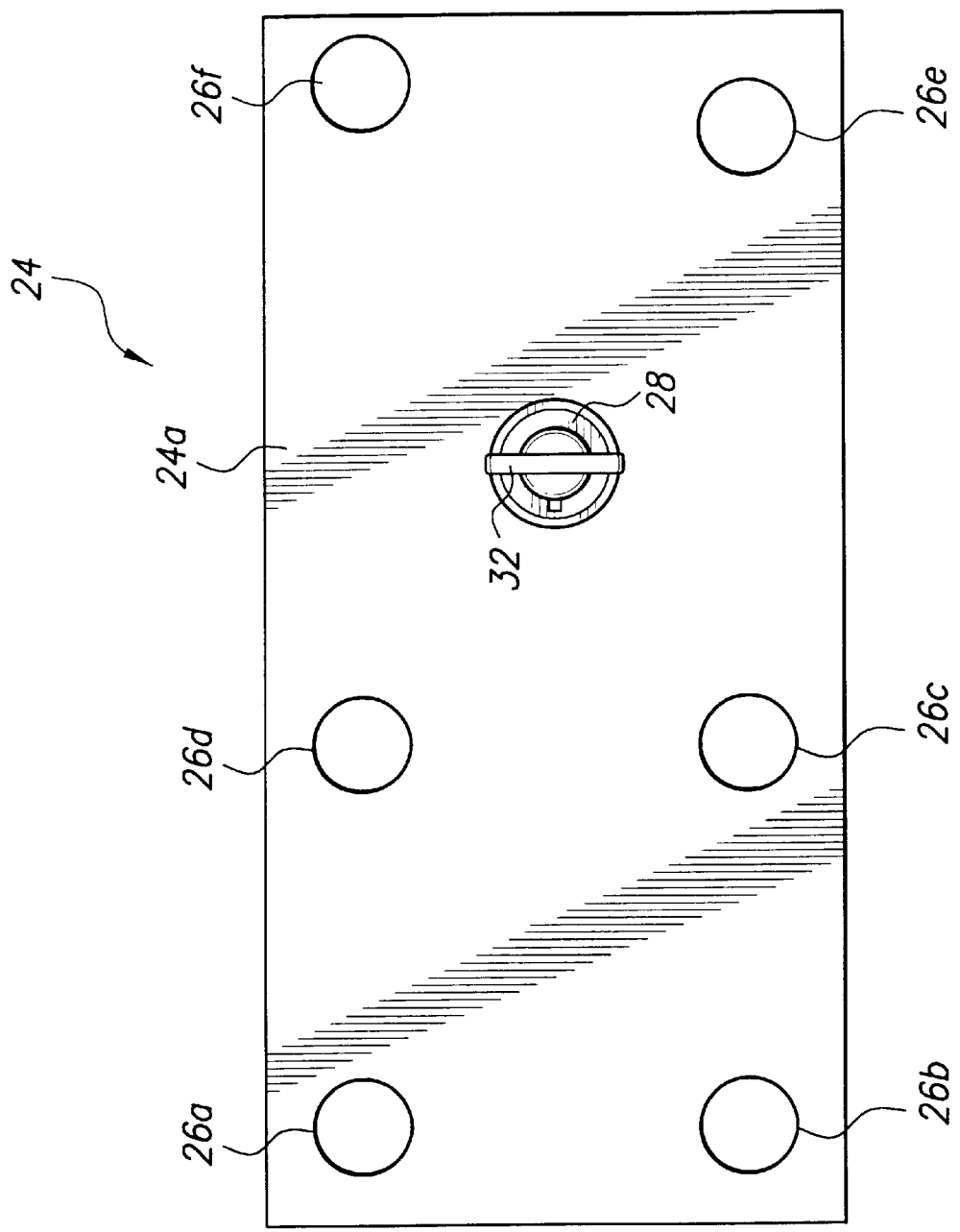
FIG. 5 is a top view of a lock plate according to the present invention in the unlocked position with a key in the lock.

The backhoe lock 10 has a lock plate 24 which has a plurality of through holes 26 or cylindrical bores, labelled 26a–26f with a–f corresponding to the position of the posts 16, defined therein which are arranged in the same configuration as the posts 16 so that the lock plate 24 is slidable over the posts 16. The lock plate 24 has a locking mechanism disposed therein. The locking mechanism may include a key lock 28 which controls a catch or catches 30 which may be extended or retracted from the middle holes 26c and 26d in order to selectively engage and disengage the notches 22 in the middle posts 16c and 16d to lock and release the lock plate 24 on the posts 16. FIG. 4 shows a top view of the lock plate 24 with the key lock 28 in the locked position, so that the catch 30 extends into the holes 26c and 26d. FIG. 5 shows a top view of the lock plate 24 with the key 32 (in this case, a tubular key, although the type of key is not critical) rotated to the unlocked position, so that the catches 30 are retracted from the holes 26c and 26d, permitting removal of the lock plate 24 from the posts 16.

Figure 6:
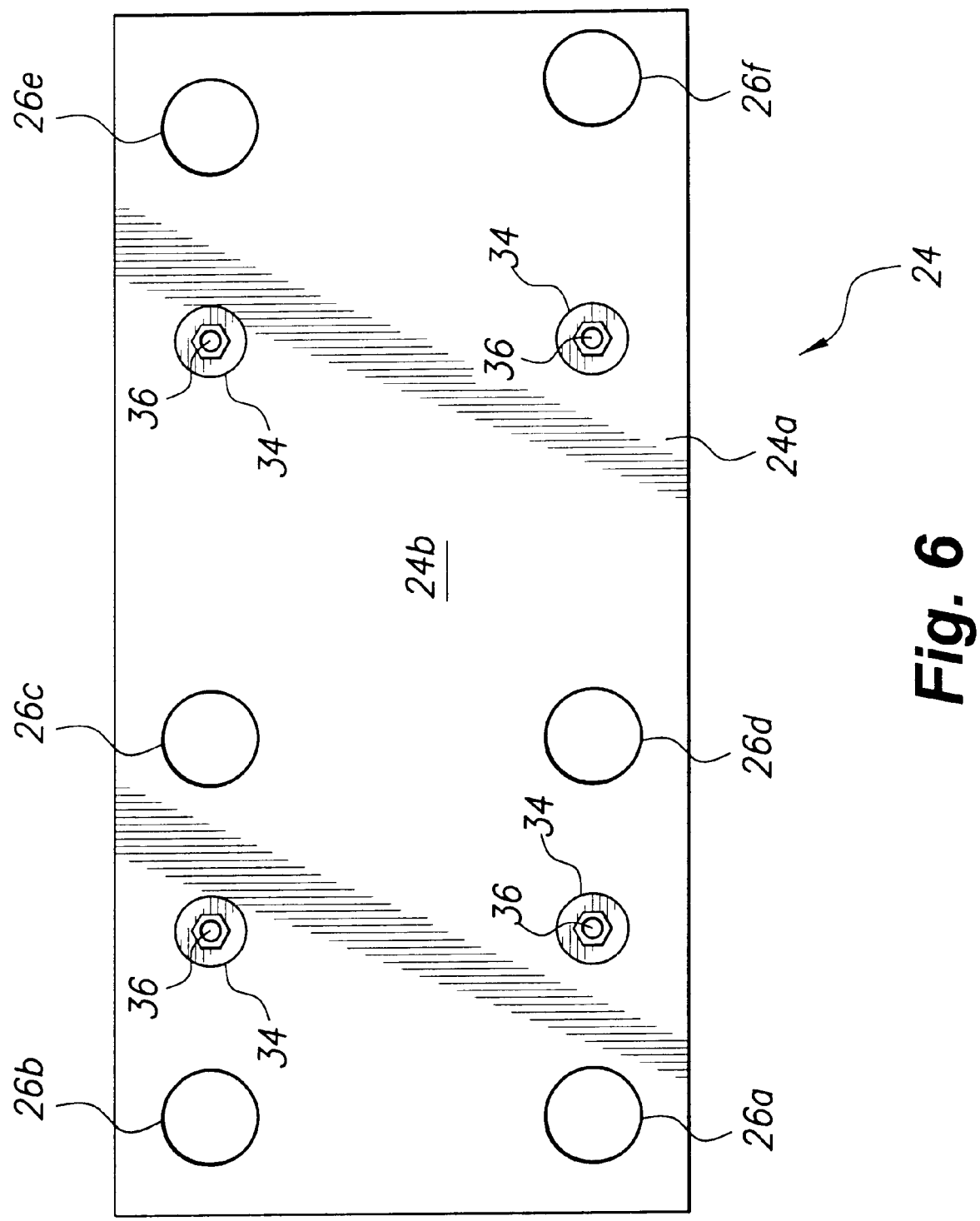
FIG. 6 is a bottom view of a lock plate according to the present invention.

The lock plate 24 may be made from an upper plate 24a and a lower plate 24b which are fastened together, the catches 30 slidably extending into the holes 26c and 26d through slots defined between the plates 24a and 24b. As shown in FIG. 6, for added security the fasteners may comprise security hex screws 34 having a head with an Allen socket with a pin 36 in the center of the socket, the heads of the screws being countersunk into the lower plate 24b so that the lock plate 24 is difficult for a thief or vandal to disassemble when the backhoe lock 10 is disposed over a steering wheel 20 and forward/reverse lever 18.

Figure 3:
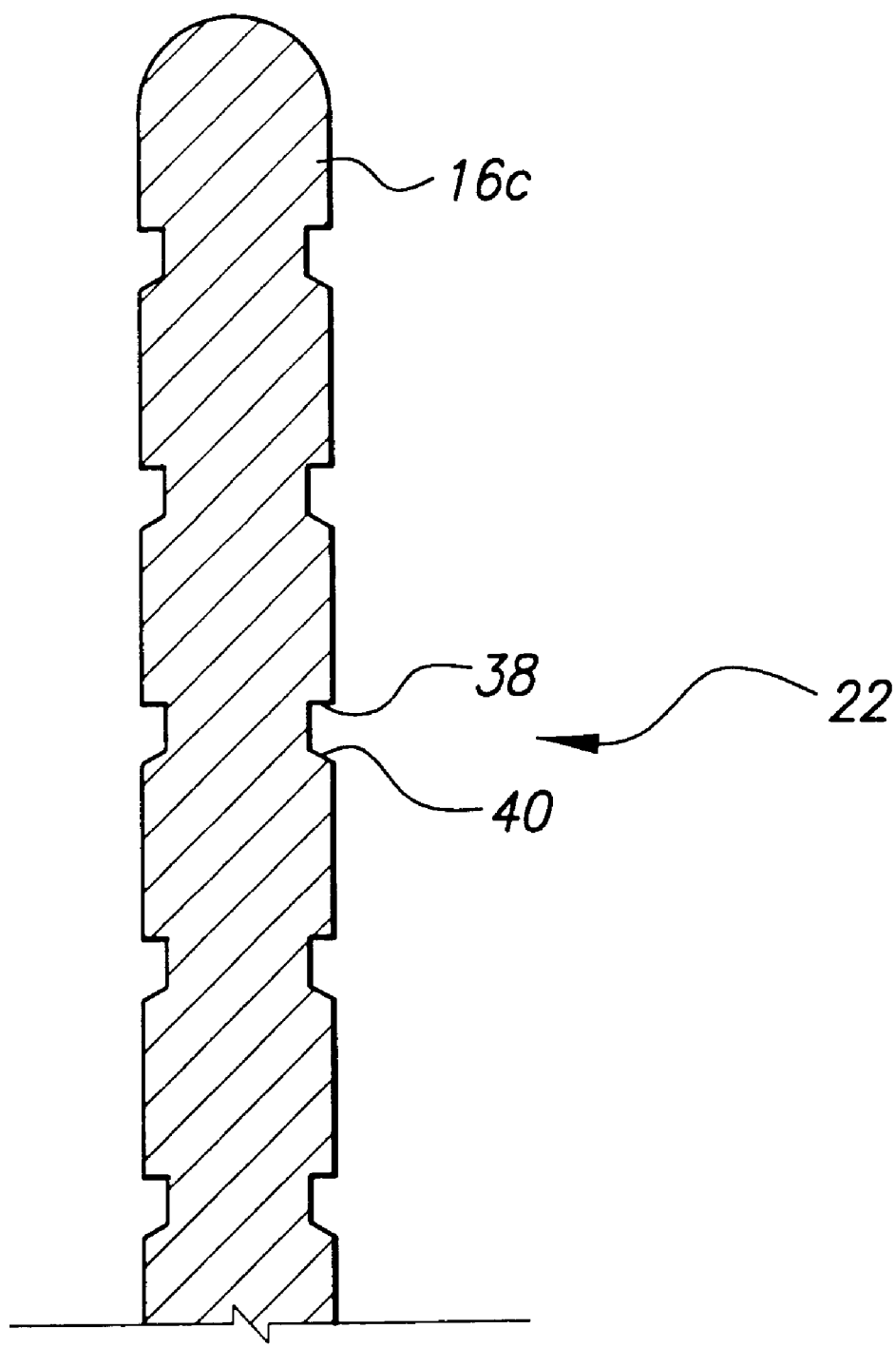
FIG. 3 is a fragmented, vertical section view through a notched post of the backhoe lock according to the present invention.

In a preferred embodiment, the key lock 28 incorporates a conventional spring-biased lock pin, so that when the key lock 28 is in the locked position, the catches 30 extend into the holes 26c and 26d, but will retract if force is applied to the edge of the catches 30 so that a ratcheting action is possible. FIG. 3 shows a preferred configuration of the notches 22 in the middle posts 16c and 16d which facilitates this ratcheting action, illustrated with reference to post 16c, post 16d being identically configured. As shown in FIG. 3, each notch 22 has an upper wall 38 which is normal to a longitudinal axis through post 16c, while the lower wall 40 of the notch 22 slopes downward. Consequently, spring-biased catch 30 will gradually be retracted by the inclined plane presented by lower wall 40 as the lock plate 24 is lowered on the post 16c, but is unable to retract when the lock plate 24 is raised on the post 16c. Therefore, lock plate 24 cannot be raised for removal from the posts 16 without key 32 being inserted into key lock 28 to rotate the cylinder to the unlocked position. Catches 30 may be independently connected to key lock 28, or may be incorporated into a unitary plate connected to the key lock 28. A spring-biased key lock 28 is optional, however, and any lock mechanism, including a combination lock, may be incorporated into the lock plate 24 which is capable of extending and retracting catches 30 in the holes 26c and 26d to engage the notches 22 to prevent removal of the lock plate 24 from the posts 16 in the locked position, and to permit removal of the lock plate 24 from the posts 16 in the unlocked position.

Preferably, the lock plate 24 has the same length and width as the base plate 12. Representative dimensions of the base plate may be 6 ⅜"×3"×1 ½". The base plate 12 and the lock plate 24 may be made from steel, aluminum alloys, or other durable material, and may be painted for improved corrosion resistance. The posts 16 may be made from steel, aluminum, or other durable material, and may be plated or coated with corrosion resistant material, as is known in the art. As seen most clearly from the position of the holes 26 in FIGS. 4–6, the end posts 16e and 16f and corresponding end holes 26e and 26f are preferably not equidistant from the middle posts 16c, 16d and middle holes 26c, 26d. Rather, one of the post 16e,f—hole 26e,f combinations is offset from the other, e.g., post 16e and hole 26e may be three inches from post 16c and hole 26c, respectively, while post 16f and hole 26f may be three and one-half inches from post 16d and hole 26d, respectively, measured center to center. The purpose in offsetting the end posts 16e and 16f is to prevent the lock plate 24 from being installed on, the posts 16 with the key lock 28 facing the base plate 12.

In use, the backhoe operator turns the steering wheel 20 to align the webbing or spoke 42 of the steering wheel 20 with the forward-reverse lever 18 of the backhoe (the forward-reverse control lever 18 is typically positioned on the left side of the steering column slightly beneath the steering wheel, and extends from the steering column in approximately the nine o'clock position). The base plate 12 is placed beneath the control lever 18 with the posts 16 straddling the control lever and the steering wheel spoke 42. Preferably the base plate 12 is aligned so that the four posts 16c, 16d, 16e and 16f spaced farthest apart are inside the radius of the steering wheel 20, with posts 16a, 16b, 16c and 16d straddling the rim of the steering wheel 20, as shown in FIG. 1. The lock plate 24 is then aligned with the base plate 12, lifting the base plate 12 upward and pressing the lock plate 24 downward to engage the catches 30 in the notches 22 on the middle posts 16c and 16d, securing the backhoe lock 10 in place. A second method of installing the backhoe lock 10 for smaller steering wheels is to orient the base plate 12 with the four posts 16a, 16b, 16c, and 16d inside the radius of the steering wheel 20 and the posts 16e and 16f outside the rim of the steering wheel 20. If the forward-reverse control lever 18 has a lever guard beneath it, such as some John Deere® models, then the base plate 12 is placed under the forward-reverse lever 18 at an angle and the steering wheel 20 is slowly rotated clockwise while inserting the spoke 42 between the posts 16. Finally, if the machine does not have a column mounted forward-reverse control lever 18 or throttle control lever (on some agricultural machinery), but does have a control panel or console within reach of the posts 16, the base plate 12 may placed over the spoke 42 of the steering wheel 20, preferably with posts 16a, 16b, 16c, and 16d straddling the rim, and the lock plate 24 is placed under the steering wheel 20 and onto the posts 16, the base plate 12 and lock plate being pushed together to clamp the rim and spoke 42 of the steering wheel 20 with the ends of the posts 16 hitting the console to lock the control levers in place.

With the backhoe lock 10 installed over the steering wheel 20 and forward-reverse lever 18, the steering wheel 20 is immobilized from turning by being attached to the forward-reverse control lever 18, so that the machine can only go in the direction that the wheels are pointed when the backhoe lock 10 is installed. If an individual attempts to turn the wheel 20 with the backhoe lock 10 installed, the lock 10 not only prevents the wheel from turning, it additionally causes the transmission to engage in forward or reverse, depending upon the direction of wheel rotation, by only ¼ of a turn.

It is to be understood that the present invention is not limited to the embodiments described above, but encompasses any and all embodiments within the scope of the following claims. In particular, it will be understood that the scope of the present invention extends to any lock mechanism having a base plate with posts extending therefrom, including at least one serrated or notched post, and a lock plate having a lock mechanism and holes which align with the posts, so that the lock mechanism controls a catch which engages the notches or serrations to removably secure the lock plate on the base plate.

I claim:
1. A backhoe lock, comprising:
   (a) a base plate having a top surface,;
   (b) a plurality of posts extending from the top surface of said base plate in a direction normal to said base plate, at least one of said posts having a plurality of notches defined therein;
   (c) a lock plate having:
      (i) an upper plate;
      (ii) a lower plate; and
      (iii) a plurality of security screws having a head with a hex socket and a pin disposed in the center of the socket, said security screws fastening said lower plate to said upper plate, the heads of said security screws being flush with the lower plate;
      (iv) said lock plate having a plurality of holes defined therein, the holes being configured to align with said plurality of posts so that said lock plate is slidable on the posts; and
   (d) a lock mechanism disposed in said lock plate, the lock mechanism having at least one catch, the lock mechanism having a locked position in which the at least one catch extends into one of the holes defined in said lock plate to engage one of said notches in order to prevent removal of said lock plate from said posts, and an unlocked position in which the at least one catch retracts from the hole in order to permit removal of said lock plate from said posts.

2. The backhoe lock according to claim 1, wherein said lock mechanism comprises a key lock.

3. The backhoe lock according to claim 1, wherein said lock mechanism is spring-biased so that the at least one catch resiliently extends into one of the holes defined in said lock plate when said lock mechanism is in the locked position.

4. The backhoe lock according to claim 1, wherein said plurality of posts comprises two parallel rows of posts, each row having in linear order a first end post, a middle post, and a second end post, wherein the first end posts and the middle posts are arranged in a square configuration on said base plate, and wherein said second end posts are spaced apart from the square configuration.

5. The backhoe lock according to claim 4 wherein one of said second end posts is spaced apart from the square configuration by a distance greater than the other second end post.

6. The backhoe lock according to claim 4, wherein each of said middle posts has a plurality of notches defined therein.

7. The backhoe lock according to claim 1, wherein each said notch has an upper wall distal to said base plate and normal to a longitudinal axis through said post, and a lower wall proximal to said base plate and sloping downward, whereby said lock plate may be pushed downward on said posts towards said base plate and is prevented from being pulled upward on said posts away from said base plate when said lock mechanism is in the locked position.

8. The backhoe lock according to claim 1, wherein said lock mechanism comprises a key lock, the backhoe lock further comprising a key for switching said key lock between a locked position and an unlocked position.

9. The backhoe lock according to claim 8, wherein said key comprises a tubular key.

10. A backhoe lock, comprising:

(a) a base plate having a top surface;

(b) a plurality of posts extending from the top surface of said base plate in a direction normal to said base plate, said plurality of posts including two parallel rows of posts, each row having in linear order a first end post, a middle post, and a second end post, wherein the first end posts and the middle posts are arranged in a square configuration on said base plate, and wherein said second end posts are spaced apart from the square configuration, said middle posts having a plurality of notches defined therein;

(c) a lock plate having a plurality of holes defined therein, the holes being configured to align with said plurality of posts so that said lock plate is slidable on the posts; and (d) a lock mechanism disposed in said lock plate, the lock mechanism having at least one catch, the lock mechanism having a locked position in which the at least one catch extends into two of the holes defined in said lock plate to engage one of said notches defined in each middle post in order to prevent removal of said lock plate from said posts, and an unlocked position in which the at least one catch retracts from the hole in order to permit removal of said lock plate from said posts.

11. The backhoe lock according to claim 10, wherein said lock mechanism comprises a key lock.

12. The backhoe lock according to claim 10, wherein said lock mechanism is spring-biased so that the at least one catch resiliently extends into one of the holes defined in said lock plate when said lock mechanism is in the locked position.

13. The backhoe lock according to claim 10, wherein said lock plate comprises, (a) an upper plate;

(b) a lower plate;

(c) a plurality of security screws having a head with a hex socket and a pin disposed in the center of the socket, said security screws fastening said lower plate to said upper plate, the heads of said security screws being flush with the lower plate.

14. A backhoe lock, comprising:

(a) a base plate having a top surface;

(b) a plurality of posts extending from the top surface of said base plate in a direction normal to said base plate, at least one of said posts having a plurality of notches defined therein;

(c) a lock plate having a plurality of holes defined therein, the holes being configured to align with said plurality of posts so that said lock plate is slidable on the posts; and (d) a lock mechanism disposed in said lock plate, the lock mechanism having at least one catch, the lock mechanism having a locked position in which the at least one catch extends into one of the holes defined in said lock plate to engage one of said notches in order to prevent removal of said lock plate from said posts, and an unlocked position in which the at least one catch retracts from the hole in order to permit removal of said lock plate from said posts, said lock mechanism being spring-biased so that the at least one catch resiliently extends into one of the holes defined in said lock plate when said lock mechanism is in the locked position;

(e) wherein said plurality of posts comprises two parallel rows of posts, each row having in linear order a first end post, a middle post, and a second end post, wherein the first end posts and the middle posts are arranged in a square configuration on said base plate, and wherein said second end posts are spaced apart from the square configuration.

15. The backbone lock according to claim 14, wherein said lock mechanism comprises a key lock, the backhoe lock further comprising a key for switching said key lock between a locked position and an unlocked position.

16. The backhoe lock according to claim 15, wherein said key comprises a tubular key.

17. The backhoe lock according to claim 14, wherein each said notch has an upper wall distal to said base plate and normal to a longitudinal axis through said post, and a lower wall proximal to said base plate and sloping downward, whereby said lock plate may be pushed downward on said posts towards said base plate and is prevented from being pulled upward on said posts away from said base plate when said lock mechanism is in the locked position.

* * * * *